US012760630B2

(12) United States Patent
Muijderman et al.

(10) Patent No.: US 12,760,630 B2
(45) Date of Patent: Oct. 13, 2026

(54) UNLOADING VALVE AND A GAS LIFT SYSTEM AND A METHOD OF INSTALLING SUCH A GAS LIFT SYSTEM

(71) Applicant: SHELL USA, INC., Houston, TX (US)

(72) Inventors: Marco Muijderman, Amsterdam (NL); Wouter Johannes Gregorius Keultjes, Amsterdam (NL); Erik Kerst Cornelissen, Amsterdam (NL); Coen Van Schie, Amsterdam (NL)

(73) Assignee: SHELL USA, INC.

( * ) Notice: Subject to any disclaimer, the term of this patent is extended or adjusted under 35 U.S.C. 154(b) by 0 days.

(21) Appl. No.: 18/875,202

(22) PCT Filed: Jul. 12, 2023

(86) PCT No.: PCT/EP2023/069306

§ 371 (c)(1),
(2) Date: Dec. 16, 2024

(87) PCT Pub. No.: WO2024/013225

PCT Pub. Date: Jan. 18, 2024

(65) Prior Publication Data

US 2025/0369319 A1 Dec. 4, 2025

(30) Foreign Application Priority Data

Jul. 15, 2022 (EP) .................................... 22185226

(51) Int. Cl.

| | |
|---|---|
| ***E21B 43/12*** | (2006.01) |
| ***E21B 34/08*** | (2006.01) |
| ***F16K 1/44*** | (2006.01) |
| ***F16K 17/30*** | (2006.01) |

(52) U.S. Cl.

CPC ............ *E21B 43/123* (2013.01); *E21B 34/08* (2013.01); *F16K 1/443* (2013.01); *F16K 17/30* (2013.01)

(58) Field of Classification Search

CPC ........ E21B 43/123; E21B 34/08; F16K 1/443; F16K 17/30; F16K 15/044; F16K 17/34; F16K 17/196; Y10T 137/7866–7868; Y10T 137/2934

USPC ...................................... 137/516.25; 166/386

See application file for complete search history.

(56) References Cited

U.S. PATENT DOCUMENTS 1,767,201 A * 6/1930 Boynton ................. F04B 49/10 417/115
1,767,202 A * 6/1930 Boynton ................... B41L 7/00 137/155
1,768,109 A * 6/1930 Boynton ............... E21B 43/123 137/155

(Continued)

OTHER PUBLICATIONS

Bellarby, "Well Completion Design", Developments in Petroleum Science, 2009, vol. 56, pp. 303-319.

(Continued)

*Primary Examiner* — Marina A Tietjen
(74) *Attorney, Agent, or Firm* — SHELL USA, INC.

(57) ABSTRACT

An unloading valve, which allows fluid flow in a flow direction through the unloading valve up to a predetermined maximum flow rate, and which blocks fluid flow in a blocking direction. The unloading valve is specifically suited for use in a continuous gas lift system. It can be installed in a wellbore tubular by punching it into the wall of the wellbore tubular using a punch tool run within the tubular bore.

9 Claims, 5 Drawing Sheets

(56) References Cited

U.S. PATENT DOCUMENTS

| | | | | | |
|---|---|---|---|---|---|
| 1,793,193 | A * | 2/1931 | Price | E21B 34/06 | 137/516.25 |
| 2,381,929 | A | 8/1945 | Marcel | | |
| 2,526,695 | A * | 10/1950 | Schlumberger | E21B 43/112 | 166/55.2 |
| 2,540,122 | A * | 2/1951 | Kinley | E21B 43/12 | 166/229 |
| 2,544,601 | A * | 3/1951 | Kinley | E21B 43/08 | 166/212 |
| 3,450,206 | A | 6/1969 | Watkins | | |
| 3,584,645 | A | 6/1971 | Radig | | |
| 8,657,015 | B2 * | 2/2014 | Patel | E21B 34/06 | 166/325 |
| 8,925,638 | B2 | 1/2015 | Wygnanski | | |
| 11,851,976 | B2 | 12/2023 | Cornelissen et al. | | |
| 12,180,794 | B2 | 12/2024 | Berge | | |
| 2006/0169333 | A1 | 8/2006 | Lee | | |
| 2009/0218103 | A1 * | 9/2009 | Aakre | E21B 43/12 | 166/373 |
| 2012/0227839 | A1 * | 9/2012 | Veit | E21B 43/25 | 137/538 |
| 2013/0233555 | A1 * | 9/2013 | Hallundbæk | E21B 34/06 | 166/55 |
| 2015/0192001 | A1 * | 7/2015 | Hall | E21B 43/086 | 166/205 |
| 2024/0418059 | A1 | 12/2024 | Cornelissen et al. | | |

OTHER PUBLICATIONS

"Production Optimisation", Kinley Perforator, Expro, Retrieve From "exprogroup.com/wellintervention" 3 Pages.

International Search Report and Written Opinion received for PCT Patent Application No. PCT/EP2023/069306, mailed on Sep. 5, 2023, 10 pages.

* cited by examiner

UNLOADING VALVE AND A GAS LIFT SYSTEM AND A METHOD OF INSTALLING SUCH A GAS LIFT SYSTEM

CROSS REFERENCE TO RELATED APPLICATIONS

This is a National stage application of International Application No. PCT/EP2023/069306, filed 12 Jul. 2023, which claims priority of European Application No. 22185226.2 filed 15 Jul. 2022 which is incorporated herein by reference in its entirety.

FIELD OF THE INVENTION

In one aspect the invention relates to an unloading valve. In another aspect, the invention relates to a gas lift system employing such an unloading valve.

BACKGROUND TO THE INVENTION

Annular gas lift is the most common method of getting gas into a liquid flow stream through the bore of a wellbore tubular, such as a production tubular. Lift gas is injected through the wellhead (or a gas lift-enabled tree in a subsea well) and typically into the production ('A') annulus. The lift gas goes from the annulus into the tubing through a gas lift valve, which is typically an orifice valve. Conventionally, the gas lift valve sits in a mandrel associated with the wellbore tubular, such as a side pocket mandrel. Mandrels offer minimum restriction to tubing flow and can be round or oval. The mandrels are normally a one-piece machined component in the production tubing without welds.

If such mandrels are not already provided during the completion of the well, then a production tubing may have to be replaced to retrofit gas lift valves.

It is further known to install so-called unloading valves at various intermediate depths, to facilitate kicking off a gas lift. These valves normally open and close due to changes in tubing or casing pressure. With the use of unloading valves the wellhead injection pressure of the lift gas can be kept below a certain desired value by reducing the hydrostatic head in the tubing stage by stage. The technology for getting the valves to sense and react to either the tubing or the casing pressure relies on either a nitrogen charge and/or a spring to provide the closing force.

The known unloading valves are generally too large to retrofit a tubing rather than to replace the tubing.

SUMMARY OF THE INVENTION

In accordance with one aspect of the present invention, there is provided an unloading valve, which allows fluid flow in a flow direction through the unloading valve up to a predetermined maximum flow rate, and which blocks fluid flow in a blocking direction.

In accordance with another aspect of the invention, there is provided a gas lift system comprising:

- a borehole in an earth formation;
- a wellbore tubular arranged with the borehole, comprising a tubular bore, and whereby an annular space surrounds the wellbore tubular which annular space is accessible for fluid flow;
- one or more unloading valves arranged at increasing depths within a wall of the wellbore tubular, said one or more unloading valves comprising at least one unloading valve which allows fluid flow in a flow direction through the unloading valve up to a predetermined maximum flow rate, and which blocks fluid flow in a blocking direction, whereby the flow direction allows fluid flow from the annular space into the tubular bore;
- a binary check valve arranged in the wellbore tubular at a depth below the one or more unloading valves, which binary check valves allows fluid flow from the annular space into the tubular bore at any flow rate and blocks flow in opposite direction.

In still another aspect of the invention, there is provided a method of installing of a gas lift system in a borehole in an earth formation comprising a wellbore tubular arranged with the borehole, comprising a tubular bore, and whereby an annular space surrounds the wellbore tubular which annular space is accessible for fluid flow, said method comprising steps of:

- providing an unloading valve which allows fluid flow in a flow direction through the unloading valve up to a predetermined maximum flow rate, and which blocks fluid flow in a blocking direction;
- providing a punch tool;
- running said punch tool into the tubular bore to a desired depth;
- punching the unloading valve into a wall of the wellbore tubular, whereby the flow direction of the unloading valve is directed from the annular space into the tubular bore;
- removing said punch tool from the tubular bore while leaving the unloading valve behind in the wall.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION OF THE INVENTION

The person skilled in the art will readily understand that, while the detailed description of the invention will be illustrated making reference to one or more embodiments, each having specific combinations of features and measures, many of those features and measures can be equally or similarly applied independently in other embodiments or combinations.

The present disclosure provides an unloading valve, which allows fluid flow in a flow direction through the unloading valve up to a predetermined maximum flow rate, and which blocks fluid flow in a blocking direction. Such an unloading valve, which closes upon a predetermined maximum flowrate, is so simple in design compared to pressure-regulated valves, that it can be embodied small enough so that it can be integrated within in an essentially cylindrical or slightly frustroconical housing, which can be punched through the tubing wall with a punch tool. It will be shown below that this way an entire gas lift system can be retrofitted into a production tubing that is already installed in the well, without having to remove the production tubing from the well.

Figure 1:
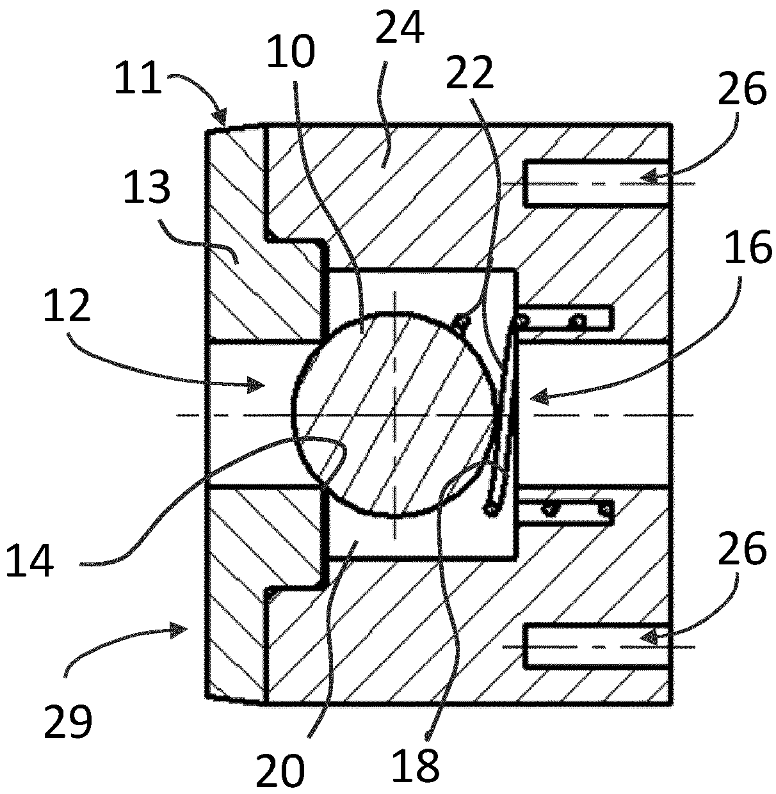
FIG. 1 shows an example of an unloading valve of the invention.

FIG. 1 shows a cross section of one embodiment of an loading valve. It comprises a valve float 10 movably arranged in a housing 24. One side of the housing 24 is provided with an inlet port 12 comprising an inlet valve seat 14. The inlet valve seat 14 is arranged to receive the valve float 10, whereby sealing the inlet port 12. The inlet port 12 and the inlet valve seat 14 may suitably be integrated into an inlet cap 13 which fits on the housing 24. It further comprises an outlet port 16 comprising an outlet valve seat 18. The outlet valve seat 18 is also arranged to receive the valve float 10, whereby sealing the outlet port 16. A fluid flow path 20 extends between the inlet port and the outlet port, and said flow direction is defined from the inlet port to the outlet port, and wherein the valve float is movably arranged in the flow path between the inlet port 12 and the outlet port 16. The valve float 10 is bidirectionally movable between the inlet valve seat 14 and the outlet valve seat 18. A bias spring 22 acts on the valve float 10, to impose said bias force on the valve float 10. The bias force is directed towards the inlet valve seat 14, and it increases as the valve float 10 is positioned closer to the outlet valve seat 18. In case of a spring, Hooke's law applies.

Fluid cannot pass through the unloading valve along the fluid flow path 20 when the valve float 10 is seated the inlet valve seat 14 or the outlet valve seat 18. Only when the valve float 10 is in an intermediate position between the inlet valve seat 14 and the outlet valve seat 18 the fluid can pass along the fluid flow path 20 through the unloading valve.

When in rest, the spring 22 just pushes the valve float 10 into the inlet valve seat 14. This way, when the pressure on the inlet port exceeds the pressure on the outlet port, the force exerted by the fluid in the inlet port can overcome the force exerted on the valve float by the fluid in the outlet port plus the residual bias force induced by the spring 22. The fluid will start to flow through the flow path 20, and will exert a force on the valve float 10, which typically increases with increasing flow rate. The force may comprise a hydrodynamic force and a force caused by an additional pressure drop over the valve float. The position of the valve float 10 will thus be an equilibrium between the bias force directed towards the inlet valve seat 14 and the net force directed towards the outlet valve seat 18, and as a result it is expected to shift towards the outlet valve seat 18 with increasing flow rate 18. Once the flow rate reaches a certain, predetermined, maximum flowrate the valve float 10 will contact the outlet valve seat 18 and flow will be completely blocked. The blocking will persist as long as the fluid pressure in the inlet port is sufficiently high to overcome both the fluid pressure in the outlet port and the bias force.

Reverse flow, directed from the outlet port 16 to the inlet port 12, will always be blocked as in that case the hydrodynamic force is directed in the same direction as the bias force. Therefore, the unloading valve described herein functions as a modified check valve allows fluid to flow in the flow direction as long as the flow rate remains below a certain predetermined maximum, and blocks flow in the opposite direction. When the flow rate exceeds the maximum, the unloading valve closes in the flow direction. A conventional check valve, on the other hand, never closes in the flow direction.

Figure 2:
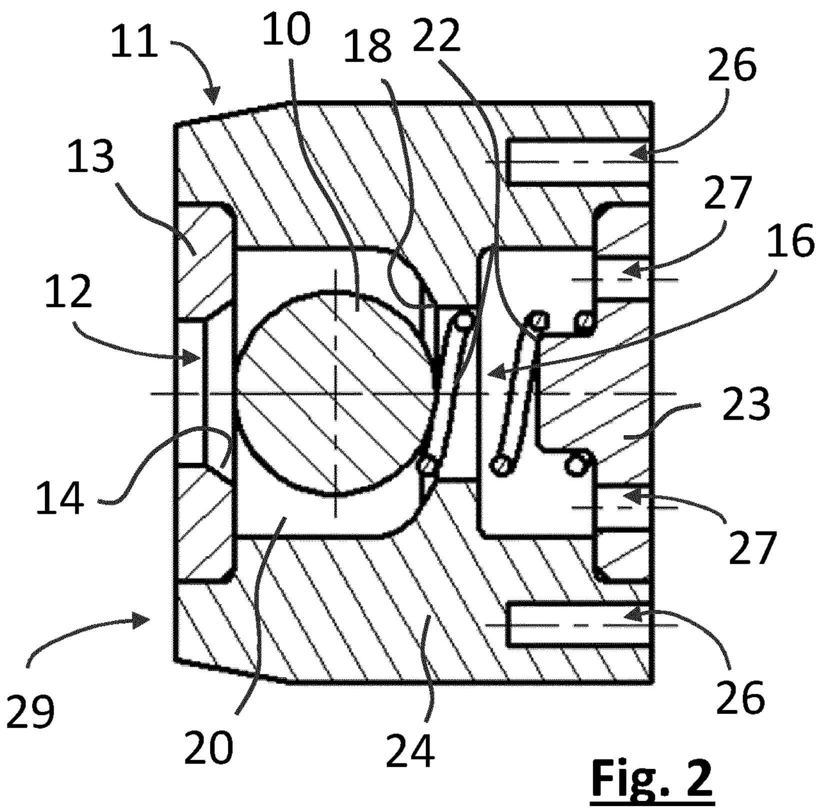
FIG. 2 shows another example of an unloading valve of the invention.

Referring now to FIG. 2, there is shown a cross section of another embodiment. In this case the inlet cap is smaller in diameter than the housing 24 so that it sinks into a recess provided at a head surface on the housing 24. Furthermore, the outlet port 16 is provided with one or more outlet channels 27, which may act as flow restrictions to increase the fluid pressure in the outlet port 16. In the embodiment of FIG. 2, the outlet channels 27 are smaller diameter channels suitably provided in an outlet cap 23. The spring 22 may also be held by the outlet cap 23. The operation of the float valve is the same as explained above.

In each of the embodiments, the valve float 10 may suitably by made out of a hard material, such as a carbide or a nitride. The examples shown herein employ silicon nitride ($Si_3N_4$). The housing 24 and/or the caps (13,23) are preferably made out of an alloy that provides a high yield point and high toughness. Prototypes tested herein were made out of alloy Premium 1.2709ESU commercially available from, for example, Abrams Premium Steel, Osnabrück, Germany. This is a X3NiCoMoTi18-9-5 alloy. The spring 22 may be made of spring wire, such as Monel 400 which is a nickel-coper alloy which is suitable for use in a well environment.

The unloading valves described above have been manufactured in applicant's laboratory with cylindrical housing 24 having an outer diameter as small as 20 mm. The axial length can be selected in relation to the wall thickness of the tubing side wall. In one particular example the axial length was about 16 mm and this was sufficient to house both the spring 22 and a spherical valve float 10 having a 7-mm diameter which can move 3.5 mm between the inlet valve seat 14 and the outlet valve seat 18. While the invention is not limited by this specific sizing, it does demonstrate how small these unloading valves can be. For the purpose of a punchable valve, a larger diameter helps to manage the compression stress in the valve housing. However, the maximum diameter of the housing is practically limited by the maximum force that the punch tool is capable of delivering. Preferably, the maximum diameter is 30 mm, more preferably 25 mm. The minimum diameter of the housing is limited by the maximum compressive strength of the housing. However, there are also other functional which tend to pose more demands on the minimum diameter than the risk of crushing the unloading valve, as the unloading valve needs to house a valve float which is durable against erosion, and the housing needs to provide enough internal space for the flow path as well.

Flow tests were done at room temperature (approx. 20° C.), to verify the behavior of the unloading valve as shown in FIG. 2. This valve had eight flow restricting outlet channels 27, evenly distributed about the circumference of the outlet cap 23 and each having an inner diameter of 1.7 mm each. However, the spring wires partly overlapped the apertures of these flow restrictions leaving a smaller effective flow area. Compressed air at a pressure of 6 bar (gauge) was passed through a ball valve fed into the inlet port of the unloading valve. The flow rate was measured downstream of the outlet port. The pressure at the outlet port was atmospheric (0 bar gauge). With each test run, the ball valve was slowly opened in small increments, to the point that the unloading valve closed. The valve closing was audible, and visible as a sharp drop in flow rate to zero. Using this methodology, the mass flow rate immediately prior to closing of the unloading valve were determined for a series of springs with different stiffnesses. Springs were changed between runs, such that the bias force acting on the valve float when the valve float was seated in contact with the outlet valve seat was different for each spring. The travel distance of the valve float from the inlet valve seat 14 to the valve float seated in the outlet valve seat 18 was 3.4 mm for each case.

Figure 3:
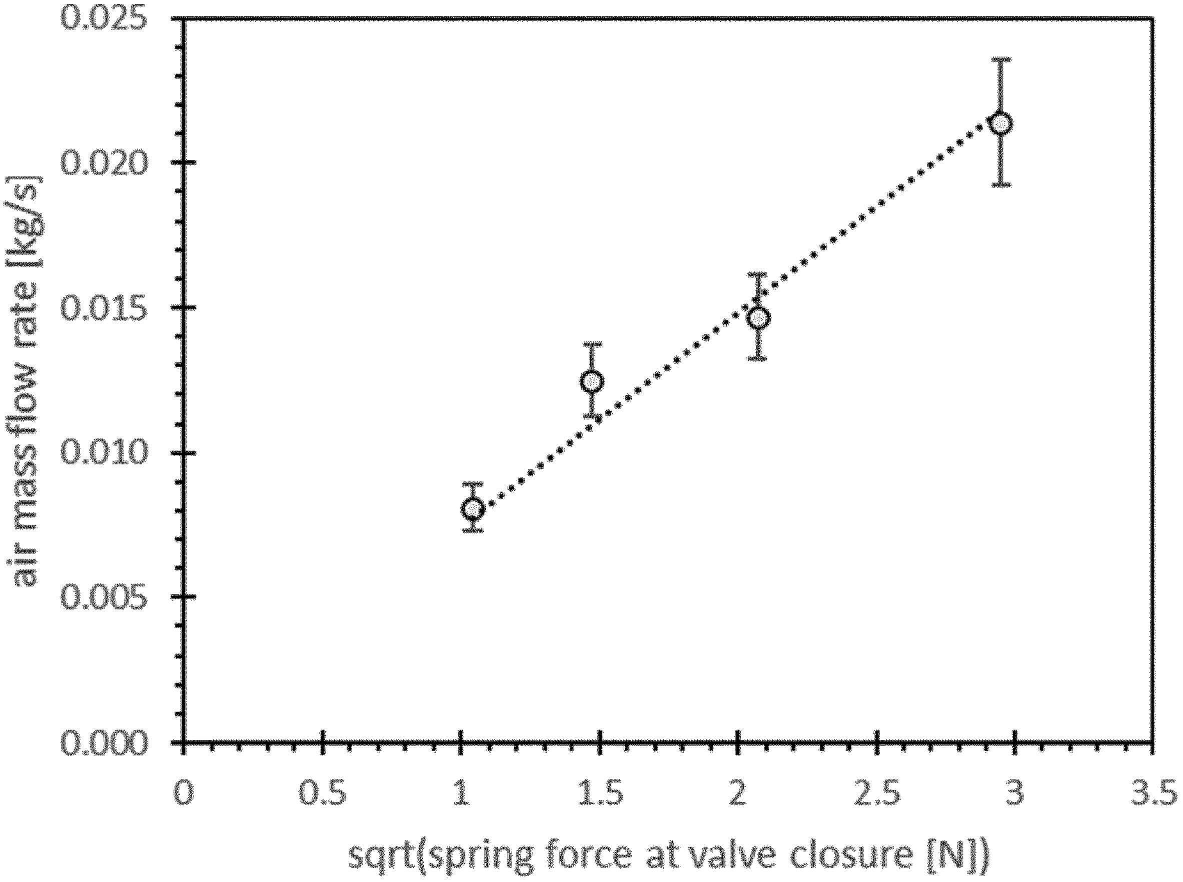
FIG. 3 shows a graph with on the x-axis spring force at 3.5 mm displacement and on the y-axis flow rate just prior to closing of the unloading valve.

The data points in FIG. 3 show the thus measured mass flow rate just prior to closure of the unloading valve, as a function of the square root of the maximum force (assumed to be equal to the spring bias force with the valve float seated in the outlet valve seat displacement). The line shows a least squares fit (forced through the origin of the plot) with a coefficient of determination $R^2=0.9965$, which is consistent with the well-known drag equation:

$$F_d = 1/2\, C_d\, \rho\, D\, v^2$$

wherein $F_d$ is the drag force, $C_d$ is a drag coefficient, p is the specific weight (density) of the fluid, D the projected cross sectional area of the float (assumed in this case to be spherically shaped), and v is the velocity of the fluid. This measurement shows that the drag coefficient in a particular unloading valve configuration can be calibrated experimentally for the flow regime of interest, which then allows to select a spring stiffness that matches a certain maximum flow rate.

FIGS. 4*a* to 4*g* illustrate a gas lift system which includes unloading valves as described above. The successive panels of illustrate successive stages of a kick-off procedure. Starting with FIG. 4*a*, there is shown a wellbore tubular, typically here depicted in the form of a production tubing 42, arranged within a casing 43 (typically the "production casing" which is the deepest reaching casing. An annulus 41 (typically referred to the "A annulus") extends between the wellbore tubular and the casing 43. The casing 43 and the production tubing 42 both reach into a borehole in an earth formation 45. At the top, the production tubing 42 may be connected to a downstream production facility, including for example a separator (not shown). The annulus 41 may be connected to a gas inlet compressor (not shown) and valve works (not shown). The production tubing 42 is typically not cemented, thus leaving the annulus 41 available for fluid flow. A production packer 47 is typically provided to isolate the annulus 41 from formation fluids that may enter the borehole from a reservoir rock 49 via perforations in provided in the casing 43. The skilled person will understand that this is a highly schematical representation.

A plurality of unloading valves 44 are provided at increasing depths in the production tubing 42. They pierce through the side wall of the production tubing 42 to establish a valved fluid communication through the side wall of the production tubing 42 with flow direction from the annulus 41 into the bore 46 of the production tubing. A binary check valve 48 is arranged in the wellbore tubular 42 at a depth below the one or more unloading valves 44, for example just above the production packer 47. The binary check valve 48 allows fluid flow from the annular space 41 into the tubular bore 46 at any flow rate. The binary check valve 48 blocks flow in opposite direction.

Initially, the production tubing 42 and the annulus 41 may be filled with water. All unloading valves 44 and the binary check valve 48 may be closed due to spring bias.

Figures 4A, 4B, 4C, 4D, 4E, 4F, 4G:
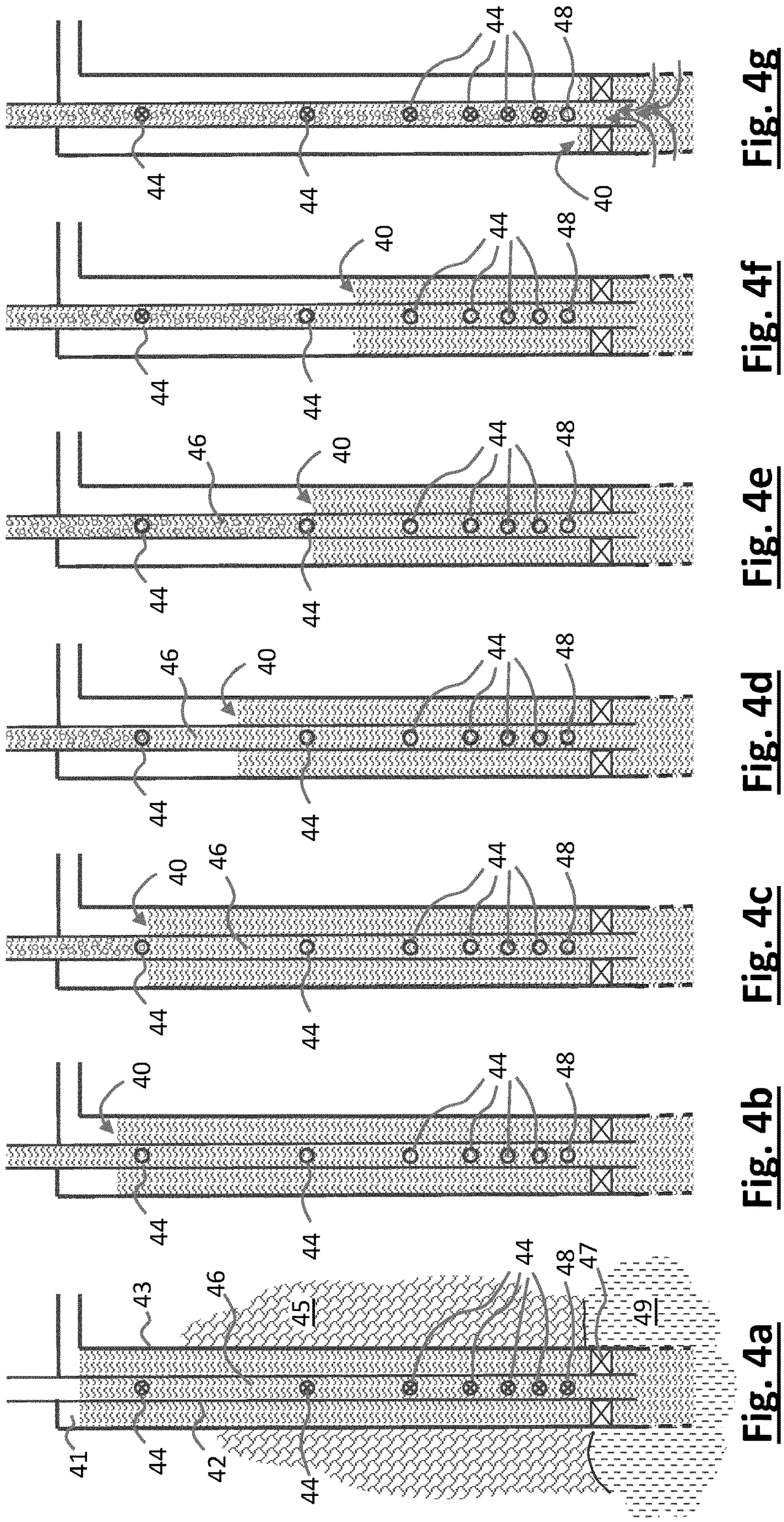
FIG. 4A to FIG. 4G schematically illustrate a gas lift system incorporating unloading valves during successive stages of a kick-off procedure.

Kicking off a gas lift involves allowing compressed gas to enter the annulus 41 at the top. Referring to FIG. 4*b*, this typically results in opening of the unloading valves 44 and the binary check valve 48, as the gas pressure will force the water level 40 in the annulus 41 downward. The gas pressure will drive displacement of the water from the annulus 41 into the tubing bore 46. In this phase, the drag force on the valve floats in the unloading valves 44, or at least the least deep one, must be kept low enough to avoid the closing of the unloading valve. As the gas pressure increases the water level 40 in the annulus 41 will go down more. The hydrostatic column in the tubing bore 46 will push back at full weight, so to force the water level 40 down, more gas pressure is needed. However, after water level 40 passes the shallowest unloading valve, gas will start to inject from the annulus 41 into the water column in the tubing bore 46. This is shown in FIG. 4*c*. As a result, the density of the liquid in the tubing bore 46 above the highest unloading valve will decrease and the hydrostatic load will decrease as well. Therefore, with the same gas pressure in the annulus 41 it will be possible to bring the water level 40 down further. Part of the gas that is admitted into the annulus will pass through the unloading valve and part will be available to create more dry volume in the annulus 41. This is shown in FIG. 4*d*. It is important that the maximum flow rate of the open unloading valve (i.e. the maximum drag force) is not exceeded, to ensure that the gas continues to be injected into the tubing bore 46.

FIG. 4*e* shows the situation where the water level 40 has reached the second unloading valve, which now also starts to function as a gas injection point into the tubing bore 46. After this has occurred, as shown in FIG. 4*f*, the least deep positioned unloading valve may close due to the flow rate exceeding the predetermined maximum flow rate for that unloading valve. As long as at least the next unloading valve in line is admitting gas into the tubular bore 46, the process continues, and successively deeper unloading valves will take over the role of admitting gas into the tubular bore 46 until the final deepest binary check valve 48 is reached. By adding more unloading valve at a single depth, the injection rate of gas into the tubing bore 46 at a certain depth can be increased, without increasing the flow rate per unloading valve. Then the entire liquid column in the tubing bore 46 is gas lifted. At that point, the hydrostatic pressure in the tubing bore 46 should be sufficiently low for new formation fluids to enter the wellbore.

In operation, the gas lift system if fully self-controlled, and the proper functioning as described above requires selecting the correct spring stiffness and numbers of unloading valves at each depth, to make sure that unloading valves do not close prematurely by prematurely exceeding predetermined maximum drag forces in the unloading valves. At the same time, one would like the less deep unloading valves to close when deeper injection points have been reached in order to make more gas available for injection at deeper levels. The one or more outlet channels 27 may help to reduce the velocity particularly of liquids and other dense fluids, compared to gases. This helps to avoid premature closing of unloading valves which are still below the water level 40.

Also, the interspacing between successive depths for successive groups of unloading valves is a free parameter to be tuned. A full design should be prepared in advance. As the behavior of the unloading valves can be characterized empirically and/or by drag modelling, the design of the entire gas lift system can be modelled with fluid flow models.

The unloading valves 44 will stay closed as the gas pressure in the annulus 41, at every depth, is necessarily higher than the pressure in the tubing bore 46 as weight of the gas column in the annulus at ever depth is less than the weight of the gas/liquid mixture inside the tubing bore 46. The gas pressure at the depth of the binary check valve 48 is necessarily equal to the hydrostatic pressure of the entire fluid column in the tubing bore 46 above the final binary check valve 48 injection point, and as the weight of the gas in the annulus 41 relatively low it means the pressure at the top (at surface) in the annulus 41 is almost as high (in any case, much higher than the pressure in the production tubing 42).

As mentioned above, the complete gas lift system can be retrofitted. Suitably, the unloading valves and also the binary check valve may be placed in an existing wellbore tubing 42 using a punch tool. A variation of punch tools has been described in literature, which may be, or may be modified to become, suitable for installing these valves. Reference is made to WO 2020/229440 A1; WO 2021/080434 A1; U.S. Pat. Nos. 2,381,929; and 2,544,601 which show various non-limiting examples. Another relevant punch tool is described in WO 2023/83946 A1. Such tools may be run rigless, for example on a wireline a slickline, a coiled tubing, or an e-line.

The punch tool may be run into the tubular bore 46 to a desired depth. At such depth, the punch tool may be activated to force (drive) the unloading valve 44 and/or the binary check valve 48 into the side wall of the wellbore tubular 42. The flow direction of the unloading valve 44 and/or the binary check valve 48 should allow a gas lift fluid flow from the annular space 41 into the tubular bore 46, but block return flow from the tubular bore 46 into the annulus 41. The punch tool may subsequently be removed from the tubular bore 46, while leaving the unloading valve 44 and/or the binary check valve 48 behind in the tubular wall.

Referring, again to FIGS. 1 and 2, the unloading valve 44 may comprise one or more receptacles 26, for receiving shear pins to mount the unloading valve 44 on a punch tool. The housing 24 may be essentially cylindrical, so that it can be punched in the tubing from the inside. However, a small taper 11 (sometimes referred to as “chamfer” or “bevel”) may be applied to part of the cylindrical side wall of the valve housing 24 (such as shown in FIG. 2) and/or the inlet cap 13 (shown in FIG. 1), to provide a frustoconical shape. The front face 29 of the unloading valve thus has a slightly smaller area than the cross sectional area along the cylindrical part of the body 24. The effect of this is that a slightly smaller hole is punched out of the tubular wall and that a slightly oversized part of the housing is then forced in the smaller hole to secure the valve more rigidly in the tubular side wall. The front face 29 at inlet side of the valve is preferably in essence flat, so that the punch pressure is distributed over a significant area available on the valve allowing the tubing wall material to shear at the edges of the flat surface.

Figure 5:
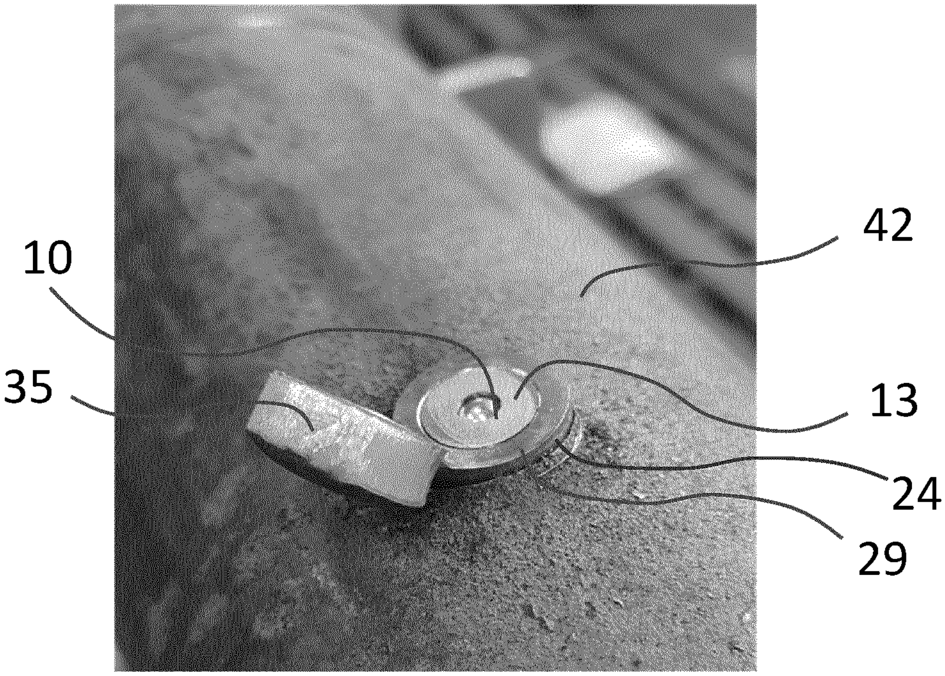
FIG. 5 shows a photograph of an unloading valve punched into a wellbore tubular.

FIG. 5 shows a photograph of an unloading valve as depicted in FIG. 2 above (20 mm diameter; 16 mm length) after punching into a 4.5 inch (approx. 11.43 cm) outer diameter wellbore tubular 42 of 17 lb/ft (approx. 25 kg/m) P110 carbon steel. The corresponding wall thickness is about 9.6 mm. The front face 29, including the inlet cap 13, of the valve housing 24 can clearly be seen, as well as the valve float 10. The wall piece 35 that has been punched out is also included in the photograph, which demonstrates the nice clean cut as punched out by the chamfered front face 29 of the valve housing 24.

Collapse tests were performed in the laboratory. A 20-mm diameter valve with a small chamfer of 0.5 mm (reduction in radius, i.e. the diameter of the flat inlet surface was 1.0 mm smaller than the diameter of the cylindrical part of the housing 24) collapsed at push back force corresponding to a pressure differential of 45 MPa. As comparison, the collapse rating of the wellbore tubular is 117 MPa. The same size valve with a larger chamfer of 1.5 mm collapsed at 175 MPa. A clear benefit of the chamfer is observed. Without wishing to be limited by theory, it is suggested that the chamfer causes a slightly smaller hole to be created, by shear in the tubular wall, and that the full diameter cylindrical part of the housing is then inserted in a de-facto slightly undersized perforation whereby some radial elastic strain around the housing 24 is induced, which holds the valve housing 24 better in place. The chamfer size can be optimized to maximize push back collapse properties, as it may vary with type and size of wellbore tubular and with size of the valve housing. The chamfer can be applied to any type of punch-in valve, including the unloading valve 44 and/or the binary check valve 48.

Figure 6:
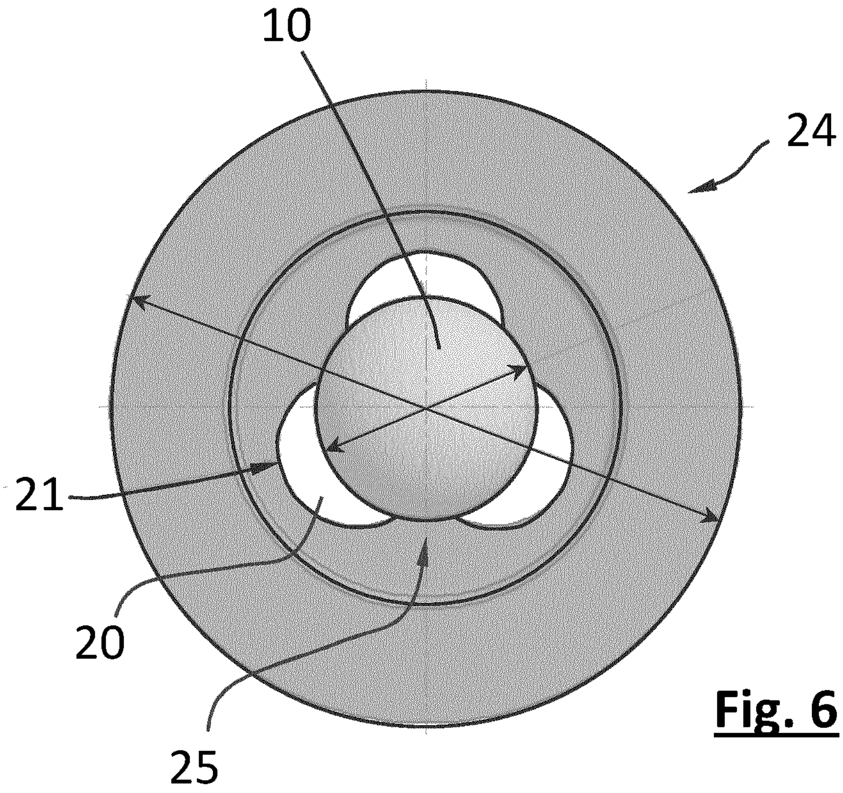
FIG. 6 shows a plan view inside the housing along the longitudinal direction of the unloading valve.

Suitably, the valve float 10 is slidingly engaged within the valve housing 24 to restrict lateral movement of the valve float 10 within the valve housing 24. FIG. 6 shows a view along the longitudinal axis (perpendicular to the viewing plane) inside the valve housing 24 with the inlet cap removed. This can be achieved for example by shaping the internal space of the valve housing 24 with internal longitudinally oriented ribs 25, which confine the valve float 10 laterally, while allowing longitudinal movement between the inlet valve seat and the outlet valve seat (not visible in the view of FIG. 6). Flow paths 20 between the inlet valve seat and the outlet valve seat extend between the ribs 25. A tolerance of 0.1 mm or thereabouts between the valve float 10 and the ribs 25 suffices to allow sufficient space for the valve float 10 to move in the longitudinal direction. This has proven to reduce lateral nuisance vibrations of the valve float 10 induced by the fluid flow. The present example employs three ribs 25, but fewer or more ribs can be used. Alternatively, a central sliding pin provided on the longitudinal axis of valve housing 24 may be used, in which case the valve float 10 may be provided with a through bore through which the sliding pin can extend to guide the valve float.

Figure 7C:
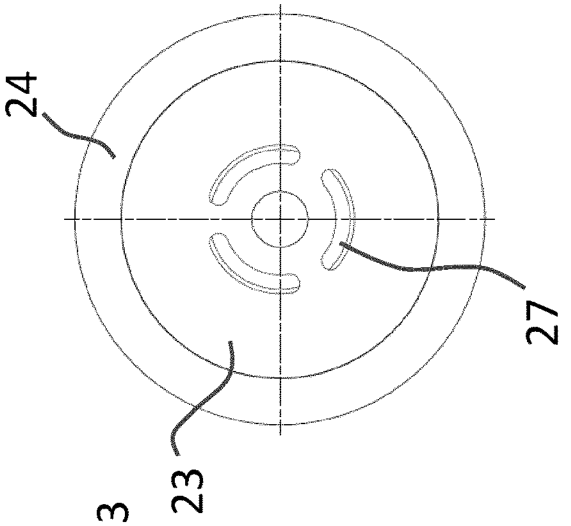
FIG. 7*c* shows a rear view of the unloading valve of FIG. 7*a*.
Figure 7B:
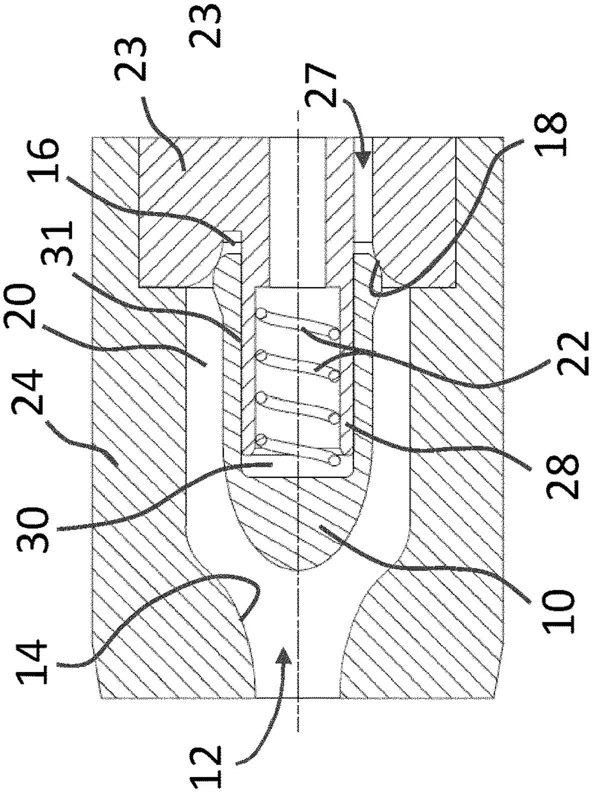
FIG. 7*b* shows a cross sectional view B-B of the unloading valve of FIG. 7*a*.
Figure 7A:
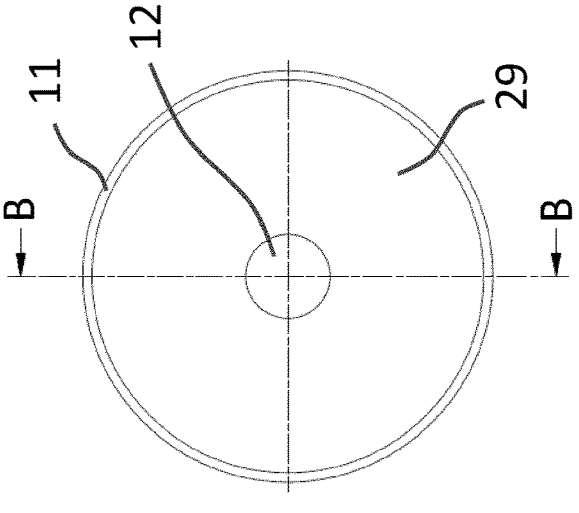
FIG. 7*a* shows a front view of another example of an unloading valve of the invention.

FIGS. 7*a* to 7*c* show an embodiment, wherein the central sliding pin 28 is provided in the form of a tubular piece, which encloses the bias spring 22. The valve float 10 has a bore receptacle 30, which is telescopically in slidable engagement 31 with the central sliding pin 28. As currently shown in FIG. 7*b*, the bias spring 22 is compressed (loaded) and the valve float 10 is in sealing contact with the outlet valve seat 18. In rest, the bias spring 22 would push the valve float 10 in sealing contact with the inlet valve seat 14. Fluid flow path 20, between the inlet port 12 and the outlet port 16, extends in an annular cavity formed around the valve float 10 and the central sliding pin 28. In this example, the outlet port 16 has an toroidal (ring) shape, and is in communication with one or more outlet channels 27 (in this particular example three are shown, but any number can be used). Due to the bias spring 22 being enclosed, it is shielded from fluid flowing along the fluid path 20 from the inlet port 12 to the outlet port 16 and thereby the flow of the fluid is less impeded and disturbed which makes this embodiment even more reliable.

The person skilled in the art will understand that the present invention can be carried out in many various ways without departing from the scope of the appended claims.

We claim:

1. A gas lift system for use in a wellbore tubular arranged in a borehole, comprising a tubular bore, and an annular space surrounding the wellbore tubular which annular space is accessible for fluid flow, the gas lift system comprising;

an unloading valve arranged in a wall of the wellbore tubular for allowing fluid flow from the annular space into the tubular bore, the unloading valve comprising:

an inlet port, an outlet port, and a fluid flow path extending between the inlet port and the outlet port;

a valve float;

an inlet valve seat arranged at the inlet port to receive the valve float thereby sealing the inlet port;

an outlet valve seat arranged at the outlet port to receive the valve float thereby sealing the outlet port;

a bias spring acting on the valve float, to impose a bias force on the valve float towards the inlet valve seat;

wherein the valve float is movably arranged in the fluid flow path between the inlet port and the outlet port, and is bidirectionally movable between the inlet valve seat and the outlet valve seat, wherein the unloading valve allows fluid flow in a flow direction from the annular space into the tubular bore when the valve float is in an intermediate position between the inlet valve seat and the outlet valve seat and wherein the unloading valve closes in the flow direction when a predetermined maximum flow rate is exceeded;

a binary check valve arranged in the wellbore tubular at a depth below the unloading valve, wherein the binary check valve allows fluid flow from the annular space into the tubular bore at any flow rate and blocks flow in opposite direction.

2. The gas lift system of claim 1, wherein a fluid cannot pass through the unloading valve along the fluid flow path when the valve float is seated in one of the inlet valve seat and the outlet valve seat, and where the fluid can pass along the fluid flow path through the unloading valve when the valve float is in an intermediate position between the inlet valve seat and the outlet valve seat.

3. The gas lift system of claim 1, which blocks fluid flow in the flow direction after the predetermined maximum flow rate has been exceeded.

4. The gas lift system of claim 1, further comprising one or more additional unloading valves and wherein the unloading valves are arranged at increasing depths within a wall of the wellbore tubular.

5. The gas lift system of claim 1, wherein the valve float is configured such that hydrodynamic drag acting on the valve float increases with flow rate to urge the valve float toward the outlet valve seat.

6. A method of installing a gas lift system in a borehole in an earth formation comprising a wellbore tubular arranged with the borehole, comprising a tubular bore, and an annular space surrounding the wellbore tubular which annular space is accessible for fluid flow, said method comprising steps of:

providing an unloading valve comprising:

an inlet port, an outlet port, and a fluid flow path extending between the inlet port and the outlet port, which allows fluid flow in a flow direction from the inlet port to the outlet port through the unloading valve;

a valve float;

an inlet valve seat arranged at the inlet port to receive the valve float thereby sealing the inlet port;

an outlet valve seat arranged at the outlet port to receive the valve float thereby sealing the outlet port;

a bias spring acting on the valve float, to impose a bias force on the valve float towards the inlet valve seat, whereby the valve float allows fluid flow from the inlet port to the outlet port up to a predetermined maximum, and blocks fluid flow in a blocking direction which is opposite of the flow direction;

wherein the valve float is movably arranged in the fluid flow path between the inlet port and the outlet port, and wherein the valve float is bidirectionally movable between the inlet valve seat and the outlet valve seat;

providing a binary check valve which allows fluid flow from the annular space into the tubular bore at any flow rate and blocks flow in opposite direction;

providing a punch tool;

running the punch tool into the tubular bore to a first desired depth;

punching the unloading valve into a wall of the wellbore tubular, whereby the flow direction of the unloading valve is directed from the annular space into the tubular bore;

running the punch tool into the tubular bore to a second desired depth below the first desired depth;

punching the binary check valve into the wall of the wellbore tubular at the second desired depth, whereby the binary check valve allows fluid flow from the annular space into the tubular bore;

removing the punch tool from the tubular bore while leaving the unloading valve and the binary check valve behind in the wall.

7. The method of claim 6, wherein the unloading valve comprises a cylindrically shaped housing section, and chamfer at the inlet side of the unloading valve, optimized to enhance push back resistance of the unloading valve left behind in the wall.

8. The gas lift system of claim 1, wherein the valve float directly engages each of the inlet valve seat and the outlet valve seat.

9. The method of claim 6, wherein the unloading valve is configured such that the valve float is operable to move from the intermediate position to the outlet valve seat when the predetermined maximum flow rate is exceeded.

* * * * *